UNITED STATES PATENT OFFICE.

WILLIAM R. WALKER, OF NEW YORK, N. Y.

MANUFACTURE OF STEEL.

967,590. Specification of Letters Patent. Patented Aug. 16, 1910.

No Drawing. Application filed April 21, 1906. Serial No. 313,006.

*To all whom it may concern:*

Be it known that I, WILLIAM R. WALKER, of New York, in the State of New York, have invented a new and useful Improvement in the Manufacture of Steel, of which the following is a specification.

The purpose of my invention is to improve the manufacture of steel by providing convenient and effective means by which it may be carried out in electric furnaces in conjunction with open-hearth furnaces or Bessemer converters, wherein the preliminary treatment of the steel is given in an open-hearth or Bessemer converter, and after the steel has been de-siliconized and to some extent de-carburized therein, it is transferred to electric furnaces and there de-phosphorized and otherwise treated so as to bring it to its final condition.

In the practice of my invention, I employ for the initial treatment of the metal, open-hearth furnaces or Bessemer converters, into which I charge the pig metal. These converters or open-hearth furnaces are preferably acid lined, and I treat the metal therein in the usual way so as to de-siliconize it and in part to de-carburize it, leaving in the metal, however, a portion of the carbon, (preferably from .04 per cent. to .3 per cent.), so as to prevent an oxidized condition of the metal, and to enable it more readily to be maintained in a fluid condition. I then take the metal which has thus been treated in the open-hearth furnaces or converters, and introduce it into a mixer or mixers, which may be and preferably are basic lined vessels and are provided with suitable heating means for retaining the metal in a suitably heated and liquid condition. The metal in its passage to the mixer passes through a spout or runner which is provided with a skimmer, preferably such a skimmer as is used in the casting of blast furnaces, and by this skimmer the floating slag is removed from the metal so as to deliver to the mixer the metal in as nearly slagless condition as possible, since otherwise the acid slag derived from the furnace or converter would prove destructive to the basic lining of the mixer. In this mixer I maintain a basic slag for the purpose of aiding the de-phosphorizing of the metal, or to neutralize the acid slag which may be mixed with the metal, and from the mixer from time to time I withdraw charges and introduce them into basic lined electric furnaces, wherein the metal is treated with additions of oxid of iron, together with burnt lime or limestone. The electric furnaces have conductors or electrodes so applied as to heat the bath to a high degree, and the reaction caused in such furnaces by the basic additions together with the continued heating of the metal, is to de-phosphorize and de-sulfurize the metal, the phosphorus passing into and being combined with the resulting slag, which may be removed during the treatment or may be retained in the furnace until the end of the heat. When the phosphorus has been eliminated to the desired extent, and the metal has attained the required heat, it is tapped from the furnace and cast into ingots or otherwise treated as desired, and while it is in the furnace, or after its removal therefrom, I may add silicon, manganese, vanadium, nickel or other elements required to modify the character of the resulting steel.

This process enables me to improve the product of the Bessemer converter in such manner as to obtain steel of the quality produced from the open-hearth furnace or by the crucible process, and enables me to employ for the Bessemer converter iron containing more phosphorus than is permissible in so-called Bessemer iron, for the acid Bessemer process does not remove phosphorus, and any phosphorus contained in the pig iron charged into the converter will appear in the resulting steel. In my process the phosphorus remaining after the treatment in the converter is eliminated to the desired extent in the electric furnace.

The construction of the apparatus and the steps of the process may be modified in various ways by those skilled in the art without departing from my invention as stated in the claims. Thus, the electric furnace may be a stationary furnace approximately of the form of the ordinary open-hearth furnace, or it may be a portable furnace, or it may be made in the form of a covered ladle provided with suitable electrodes or electrical conductors for effecting the heating of the metal. Such electrical furnaces enable me to carry on the heating of the metal without subjecting the metal to an oxidizing atmosphere.

By the use of the mixer between the furnaces or converters and the electric furnaces, I am enabled to deliver the metal to the latter in a uniform condition, and to deliver it as required, as I can retain in the mixer at the proper temperature and state a sufficiently large body of molten metal to supply the electric furnaces as rapidly as needed.

I claim:

1. In the manufacture of steel, the method herein described which consists in treating iron in an open-hearth furnace or Bessemer converter and removing therein silicon, then charging the metal into a mixer and removing therefrom from time to time as required charges of the metal and treating them in an electric furnace having a non-oxidizing atmosphere.

2. The method herein described which consists in treating iron in an open-hearth furnace or Bessemer converter having an acid lining and removing silicon and part of the carbon, then skimming the slag from the metal and delivering the metal to a mixer and finally removing it from the mixer and treating it in an electric furnace having a non-oxidizing atmosphere.

3. The method herein described which consists in treating iron in an open-hearth furnace or Bessemer converter having an acid lining and removing silicon and part of the carbon, then skimming the slag from the metal and delivering the metal to a mixer and finally removing it from the mixer and treating it in a basic lined electric furnace having a non-oxidizing atmosphere.

4. The method herein described, which consists in treating iron in an open hearth furnace or Bessemer converter having an acid lining, removing silicon and part of the carbon, then when the carbon is reduced to about three-tenths of one per cent. delivering the metal to a mixer, and finally removing it from the mixer and treating it in a basic lined electric furnace.

5. The method herein described, which consists in treating iron in an open hearth furnace or a Bessemer converter having an acid lining, removing silicon and part of the carbon, and then skimming the slag from the metal and delivering the metal to a mixer containing a basic slag, treating the metal in said mixer and removing part of the phosphorus therefrom, and thereafter transferring the metal to an electric furnace for further treatment.

6. The method herein described of making steel which consists in treating molten iron in a Bessemer converter for removal of silicon and carbon, then treating the metal in a separate vessel with a basic slag for removal of phosphorus and then treating the metal in an electric furnace.

7. The method herein described of making steel which consists in treating molten iron in a Bessemer converter for removal of silicon and carbon, then pouring the metal through basic slag contained in a separate vessel for removal of phosphorus, and then treating the metal in an electric furnace.

In testimony whereof, I have hereunto set my hand.

WILLIAM R. WALKER.

Witnesses:
 ALFRED D. WATERMAN,
 GEORGE H. SONNEBORN.